United States Patent
Ariga et al.

(10) Patent No.: US 7,065,551 B2
(45) Date of Patent: Jun. 20, 2006

(54) DATA DISTRIBUTION METHOD, SYSTEM, AND APPARATUS AND RECORDING MEDIUM RECORDING METHOD

(75) Inventors: Kenichi Ariga, Tokyo (JP); Ryuhei Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 617 days.

(21) Appl. No.: 09/986,040

(22) Filed: Nov. 7, 2001

(65) Prior Publication Data

US 2002/0055877 A1 May 9, 2002

(30) Foreign Application Priority Data

Nov. 9, 2000 (JP) .............................. 2000-342390

(51) Int. Cl.
G06F 13/00 (2006.01)
(52) U.S. Cl. ...................................................... 709/203
(58) Field of Classification Search ................ 709/217, 709/219, 232, 233, 203, 206; 705/14
See application file for complete search history.

(56) References Cited

U.S. PATENT DOCUMENTS 6,049,670 A * 4/2000 Okada et al. ................ 717/177
6,052,709 A * 4/2000 Paul ............................ 709/202
6,594,682 B1 * 7/2003 Peterson et al. ............ 718/102

FOREIGN PATENT DOCUMENTS

| JP | 11-66081 | 3/1999 |
|---|---|---|
| JP | 2000-201228 | 7/2000 |
| JP | 2000-224658 | 8/2000 |

OTHER PUBLICATIONS

Takayoshi Asakura et al., "Internet Information Filter Based on Personal Interests", Jul. 1996, pp. 17-23, vol. 49.

* cited by examiner

Primary Examiner—Robert B. Harrell
(74) Attorney, Agent, or Firm—Foley & Lardner LLP (57) ABSTRACT

In a data distribution method of distributing data selected for each of a plurality of user terminals from a distribution center to each user terminal through a communication network, the distribution center is notified of the contents of user operation for the data distributed to the user terminal. The distribution center receives a notification from the user terminal. Data to be subsequently distributed to the user terminal is selected by using the contents of the user operation contained in the notification from the user terminal. The selected data is distributed to the user terminal. A data distribution system, data distribution apparatus, and recording medium are also disclosed.

11 Claims, 9 Drawing Sheets

ADVERTISEMENT DATA TABLE 121

| ADVERTISEMENT ID | DISTRIBUTION TIME | DISTRIBUTION INTERVALS | STORAGE EXPIRATION DATE | DISTRIBUTION AREA | SPONSOR ID | CATEGORY | DATA ATTRIBUTE |
|---|---|---|---|---|---|---|---|
| aa00001 | 2000/9/10 0:00 | 10min | 10days | ALL | c003 | PC | MAIL |
| ab00002 | 2000/9/30 3:00 | 5min | 5days | SINJYUKU | d001 | FASHION | WEB |
| ab00003 | NONE | 1hour | 1Month | YOKOHAMA | d001 | FASHION | VOICE |

USER INFORMATION TABLE 122

| USER ID | TERMINAL ATTRIBUTE | CATEGORY | DEGREE | | CATEGORY | DEGREE |
|---|---|---|---|---|---|---|
| 07011112222 | MAIL WEB | PC | 10 | --------- | RESTAURANT | 5 |
| 07011113333 | MAIL WEB VOICE | FASHION | 1 | --------- | PC | 1 |
| 09044445555 | VOICE | FASHION | 10 | --------- | EVENT | 10 |

FIG. 9

DISTRIBUTION INFORMATION TABLE 131

| USER ID | ADVERTISEMENT ID | ADVERTISEMENT ID | ADVERTISEMENT ID |
|---|---|---|---|
| 07011112222 | aa00001 | aa00011 | aa00021 |
| 07011113333 | ab00032 | ab00042 | ab00002 |
| 09044445555 | ab00013 | ab00003 | ab00023 |

DATA DISTRIBUTION METHOD, SYSTEM, AND APPARATUS AND RECORDING MEDIUM RECORDING METHOD

BACKGROUND OF THE INVENTION

The present invention relates to a data distribution system for distributing data to users through a communication network and, more particularly, to a data distribution system for distributing different data to users.

With the recent rapid spread of portable telephones, there have been a growing number of occasions when users perform data communications by electronic mail in mobile environments. A great deal of attention has been paid to advertisement distribution services for distributing advertisement information to portable telephones and the like by electronic mail and Web pages. For example, conventional advertisement distribution systems for distributing information to portable telephones are disclosed in Japanese Patent Laid-Open Nos. 2000-224658 and 2000-201228.

A conventional, general advertisement distribution system is comprised of an upload terminal, distribution server, and portable terminal. The distribution server, upload terminal, and portable terminal are connected to each other through a communication network such that they can transmit/receive data to/from each other. The upload terminal is installed in a sponsor's office or advertising agent or the like that operates on behalf of the sponsor and used to register advertisement data in advertisement distribution services. The distribution server is installed in an advertisement distribution center to distribute registered advertisement data to the portable terminal. The portable terminal is carried by the user to receive the advertisement data distributed from the distribution server and display it.

Figure 11:
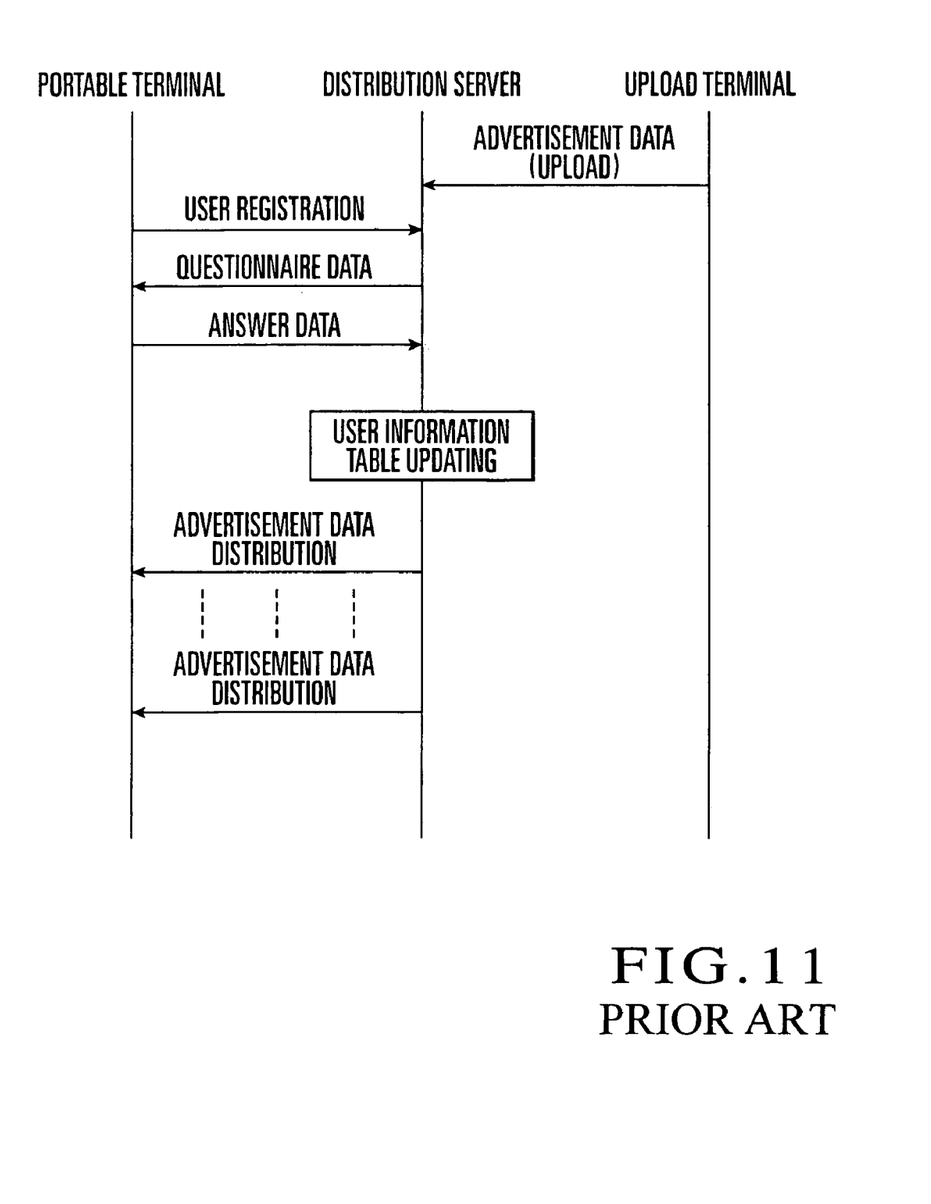
FIG. 11 is a sequence chart showing the operation of a conventional advertisement distribution system.

FIG. 11 shows the operation of a conventional, general advertisement distribution system. A sponsor creates advertisement data by itself or by requesting an advertising agent, uploads the advertisement data from an upload terminal to a distribution server, and registers it, in advance.

First of all, the user who receives advertisement distribution services uses the portable terminal to transmit user information about the user himself/herself and the portable terminal to the distribution server so as to perform user registration. After the user registration, questionnaire data is transmitted from the distribution server to the portable terminal. When the user answers the questionnaire with the portable terminal, the user information in a user information table stored in the distribution server is updated.

A questionnaire to the user contains question items for designating user's preferences and the like, and the user's preferences and the like are registered as user information in the distribution server in accordance with the answer. Thereafter, the distribution server selects and distributes advertisement data that suits the user's preferences to the portable terminal of the user. When the user's preferences change, the user transmits information about the preferences from the portable terminal to the distribution server, thus updating the user information.

According to the conventional advertisement distribution system described above, to select advertisement data that suits the preferences of each user, each user must answer questionnaires and the like. In some cases, however, no answer can be obtained, and hence advertisements that suit the user's preferences cannot be distributed. In addition, in some cases, changes in user's preferences cannot be quickly grasped, and hence distributed advertisements differ from the user's preferences.

SUMMARY OF THE INVENTION

It is an object of the present invention to provide a data distribution system which quickly and accurately grasps the preferences of users and distributes information in accordance with the preferences.

In order to achieve the above object, according to the present invention, there is provided a data distribution method of distributing data selected for each of a plurality of user terminals from a distribution center to each user terminal through a communication network, comprising the steps of notifying the distribution center of contents of user operation for the data distributed to the user terminal, causing the distribution center to receive a notification from the user terminal, selecting data to be subsequently distributed to the user terminal by using the contents of the user operation contained in the notification from the user terminal, and distributing the selected data to the user terminal.

DESCRIPTION OF THE PREFERRED EMBODIMENTS

The present invention will be described in detail below with reference to the accompanying drawings.

Figure 1:
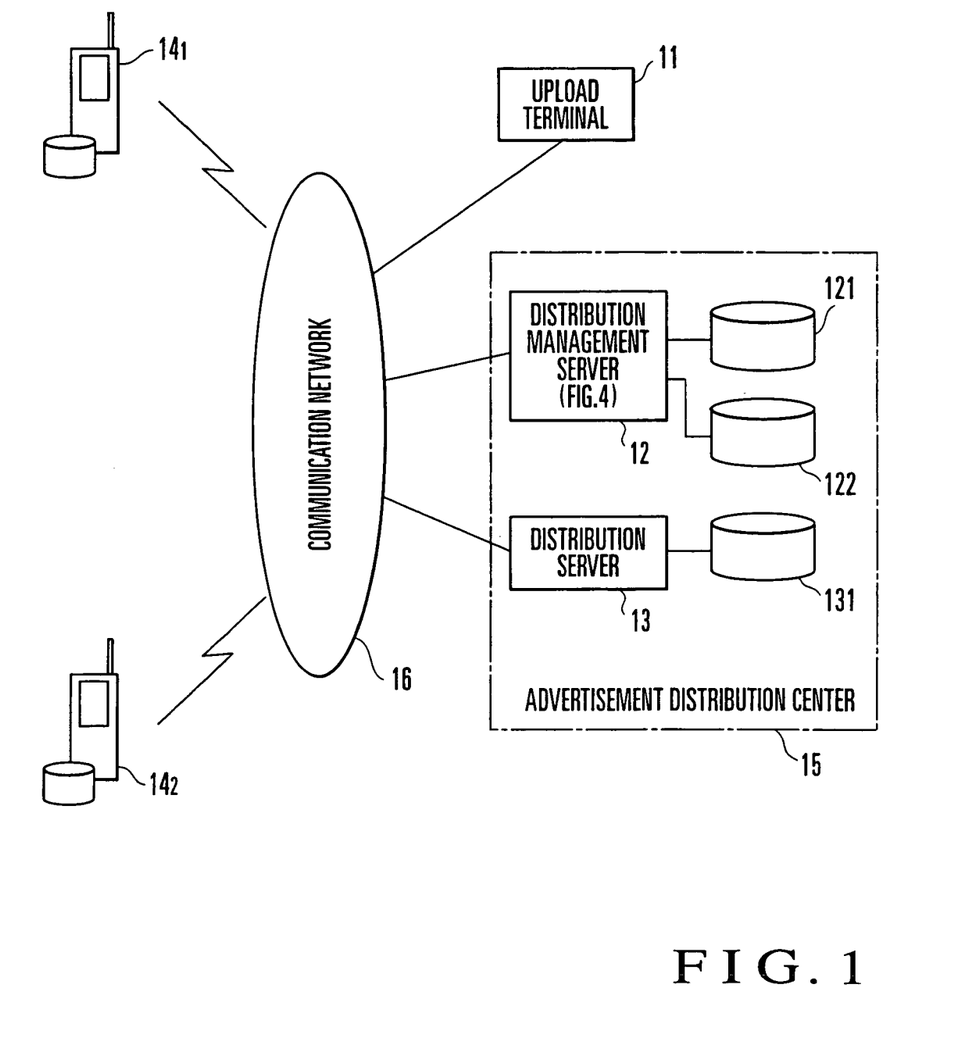
FIG. 1 is a block diagram showing an advertisement distribution system according to an embodiment of the present invention.

FIG. 1 shows an advertisement distribution system according to en embodiment of the present invention. The advertisement distribution system shown in FIG. 1 is comprised of an upload terminal 11, distribution management server 12, distribution server 13, and a plurality of portable terminals $14_1$ and $14_2$, all of which are connected to a communication network 16. The upload terminal 11 is installed in a sponsor's office, advertising agent, or the like and used to register advertisement data in an advertisement distribution service.

The distribution management server 12 is installed in an advertisement distribution center 15 and manages user information including advertisement categories to be distributed to each user who is registered to receive distributed advertisements by using a user information table 122. The distribution management server 12 determines an advertisement to be distributed to each user in accordance with the category included in user information. The distribution server 13 manages information associated with advertisement data registered from the upload terminal 11, e.g., advertisement identification codes for identifying the respective advertisement data and the categories of the advertisements, by using an advertisement data table 121. In addition to the advertisement data table 121, the user information table 122 is connected to the distribution management server 12.

The distribution server 13 is installed in the advertisement distribution center 15 like the distribution management server 12 and stores the advertisement data uploaded from the upload terminal 11. The distribution server 13 distributes advertisement data that suits the preferences of a user to a portable terminal 14 of the user in accordance with an instruction from the distribution management server 12. The distribution management server 12 and distribution server 13 may be integrated into one unit. The portable terminal 14 includes, for example, a portable telephone or PDA (Personal Data Assistant) of the user. The portable terminal 14 receives the advertisement data distributed from the distribution server 13 and displays it. A distribution information table 131 is connected to the distribution server 13.

Figure 2:
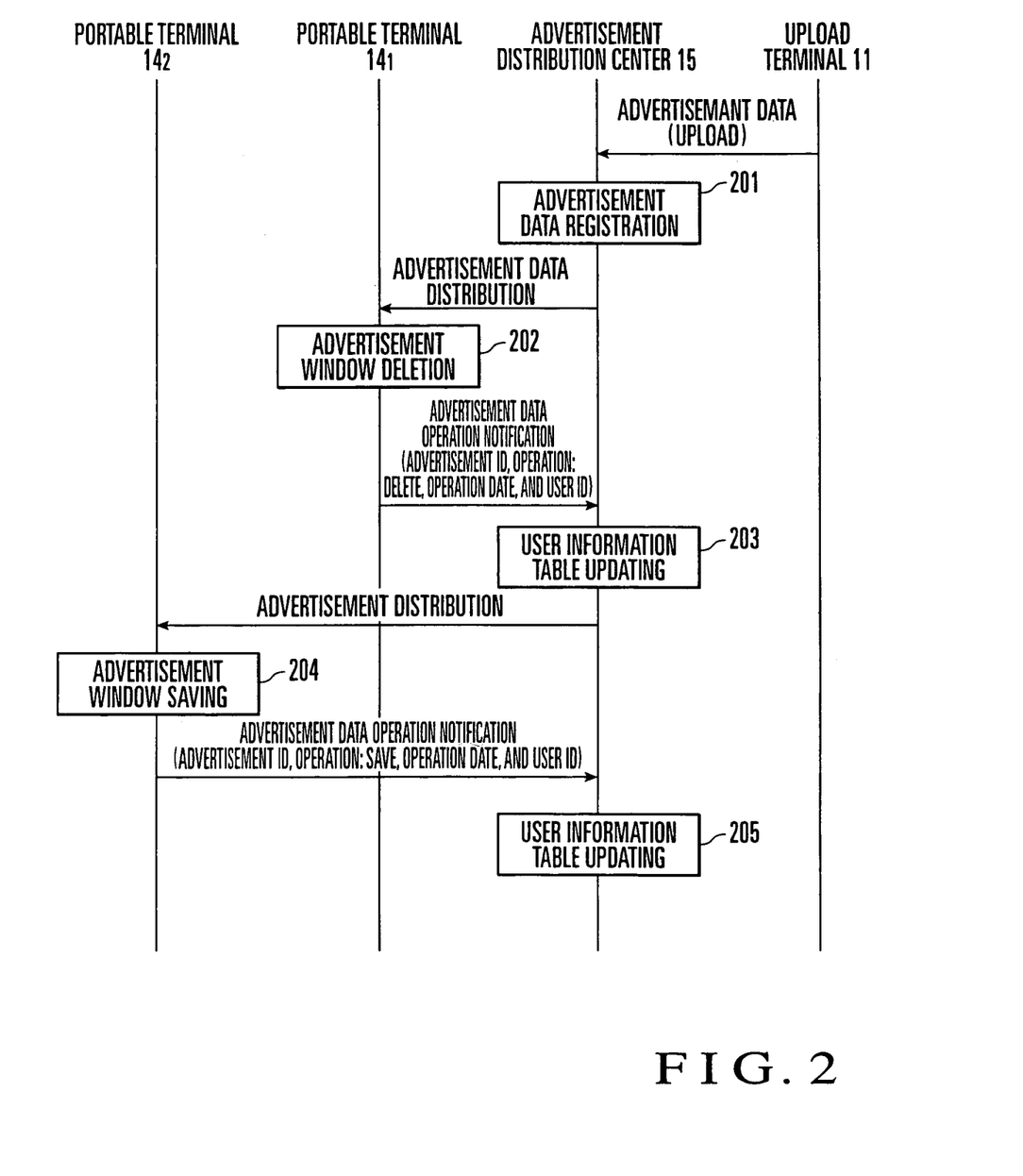
FIG. 2 is a sequence chart showing the flow of services provided by the advertisement distribution system in FIG. 1.

FIG. 2 shows the flow of services provided by the advertisement distribution system having the above arrangement.

The sponsor creates advertisement data by itself or by requesting an advertising agent, and uploads the created advertisement data from the upload terminal 11 to the advertisement distribution center 15. In the advertisement distribution center 15, the distribution server 13 stores the advertisement data in a database, and the distribution management server 12 registers an advertisement identification code (advertisement ID) for identifying the advertisement data, the category of the advertisement, and the like in the advertisement data table 121 (step S201). In accordance with an instruction from the distribution management server 12, the advertisement data registered in the distribution server 13 is distributed to the portable terminal of each user whose preference indicated by user information coincides with condition information.

A case wherein advertisement data is distributed to the portable terminal 14₁ will be described below. The portable terminal 14₁ displays the distributed advertisement data on the screen. The user sees the screen and performs operation for deletion because the contents of the advertisement do not suit the preferences of the user. The portable terminal 14₁ then deletes the advertisement data and notifies the advertisement distribution center 15 of the contents of the operation and the like (step S202). This notification contains the advertisement data identification code (advertisement ID), operation content ("deletion" in this case), operation date, and user identification code (user ID).

Upon reception of the notification, the distribution management server 12 in the advertisement distribution center 15 updates the user information table 122 in accordance with the notified information (step S203). For example, the distribution management server 12 updates the user information so as not to distribute any advertisements of the same type as the deleted advertisement data to the user from now on.

A case wherein advertisement data is distributed to the portable terminal 14₂ will be described next. The portable terminal 14₂ displays the distributed advertisement data on the screen. The user sees the screen and performs storing (saving) operation because he/she becomes interested in the contents of the advertisement. The portable terminal 14₂ stores the advertisement data and notifies the advertisement distribution center 15 of the contents of the operation and the like (step S204). In this notification, the operation content is "save".

In the advertisement distribution center 15 which has received the notification, the distribution management server 12 updates the user information table 122 in accordance with the notified information (step S205). For example, the distribution management server 12 updates the user information to distribute many advertisement data of the same type as the stored advertisement data to the user.

In the advertisement distribution system of this embodiment, therefore, the portable terminal 14 notifies the distribution management server 12 of the contents of the operation performed by the user with respect to the notified advertisement data to make the distribution management server 12 reflect the notified contents in the user information, thereby quickly and accurately knowing the advertisement data favored and wanted by the user of the portable terminal 14. This makes it possible to distribute advertisement data in accordance with the preferences of the user.

Figure 3:
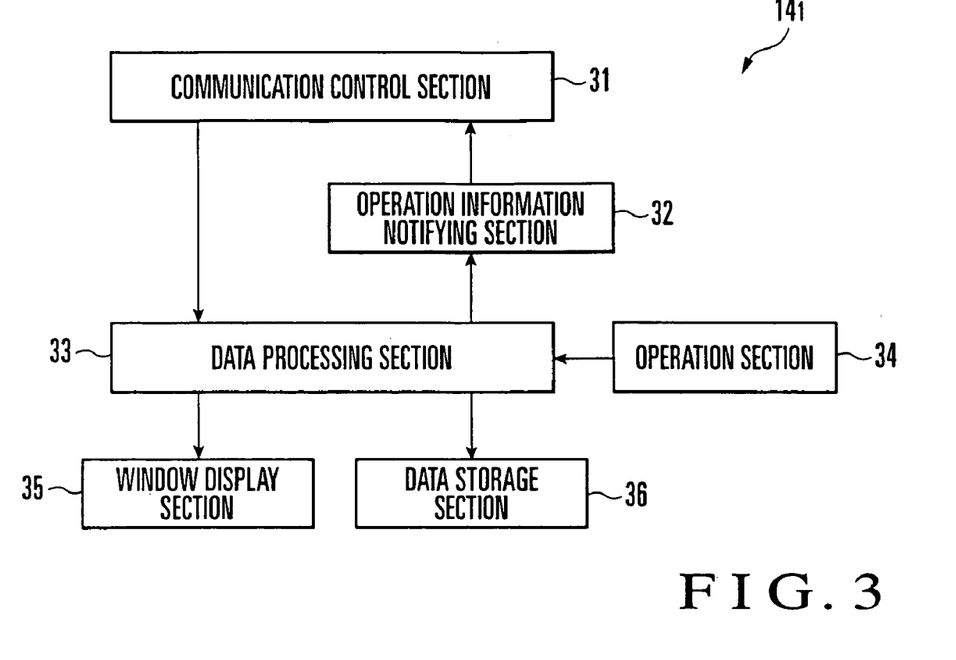
FIG. 3 is a functional block diagram of a portable terminal 14 in FIG. 1.

FIG. 3 shows the arrangement of the portable terminal 14₁. The portable terminal 14₂ has the same arrangement. The portable terminal 14₁ is comprised of a communication control section 31, operation information notifying section 32, data processing section 33, operation section 34, window display section 35, and data storage section 36. The communication control section 31 communicates with the distribution management server 12 and distribution server 13 via the communication network 16 through wire or wirelessly. The operation information notifying section 32 notifies the contents of the operation performed by the user with the operation section 34 with respect to advertisement data.

The data processing section 33 temporarily stores distributed advertisement data, analyzes it, and makes the window display section 35 display the resultant information. In addition, the data processing section 33 processes advertisement data in accordance with the user operation recognized by the operation section 34. When the user performs operation for "save" with the operation section 34, the data processing section 33 records the advertisement data on the data storage section 36. The operation section 34 is a user interface for allowing the user to operate the portable terminal 14, and recognizes the operation performed by the user, e.g., key input operation. The window display section 35 displays distributed advertisement data in a window. The data storage section 36 stores advertisement data and the like.

Figure 4:
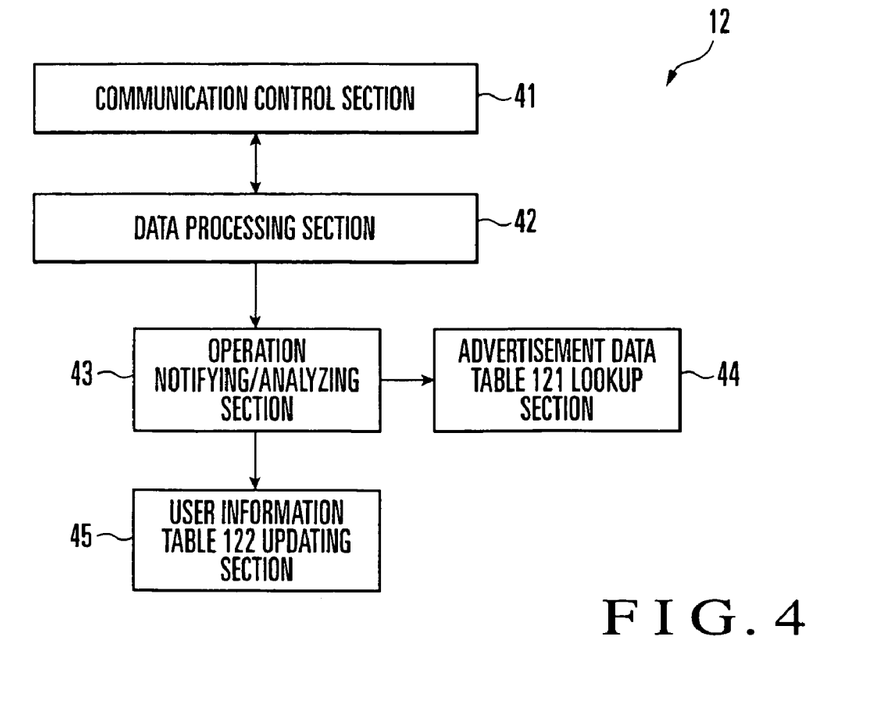
FIG. 4 is a functional block diagram of a distribution management server 12 in FIG. 1.

FIG. 4 shows the arrangement of the distribution management server 12. The distribution management server 12 is comprised of a communication control section 41, data processing section 42, operation notifying/analyzing section 43, advertisement data table 121 lookup section 44, and user information table 122 updating section 45. The communication control section 41 communicates with the distribution management server 12 and distribution server 13 via the communication network 16 though wire or wirelessly. The data processing section 42 temporarily stores the message received from the communication network 16, analyzes it, and identifies the message for notifying operation for advertisement data. In addition, the data processing section 42 temporarily stores the message to be transmitted to another apparatus and transmits it to the communication network 16 through the communication control section 41.

When the data processing section 42 identifies the notification of the operation with respect to the advertisement data from the portable terminal 14, the operation notifying/analyzing section 43 analyzes the contents of the notification. The operation notifying/analyzing section 43 obtains a category to which the advertisement data belongs from the advertisement data table 121 lookup section 44 on the basis of the advertisement identification code contained in the notification, and collates it with the contents of the user information in the user information table 122. The advertisement data table 121 lookup section 44 looks up the advertisement data table 121 with the advertisement identification code, and acquires a category to which the advertisement data belongs. The user information table 122 updating section 45 updates the user information table 122 in accordance with the collation result obtained by the operation notifying/analyzing section 43.

The operation of the distribution management server 12 will be described next. The operation of the distribution management server 12 includes three main processes, namely an advertisement reception process, a distribution condition update process, and a distribution process.

Figure 5:
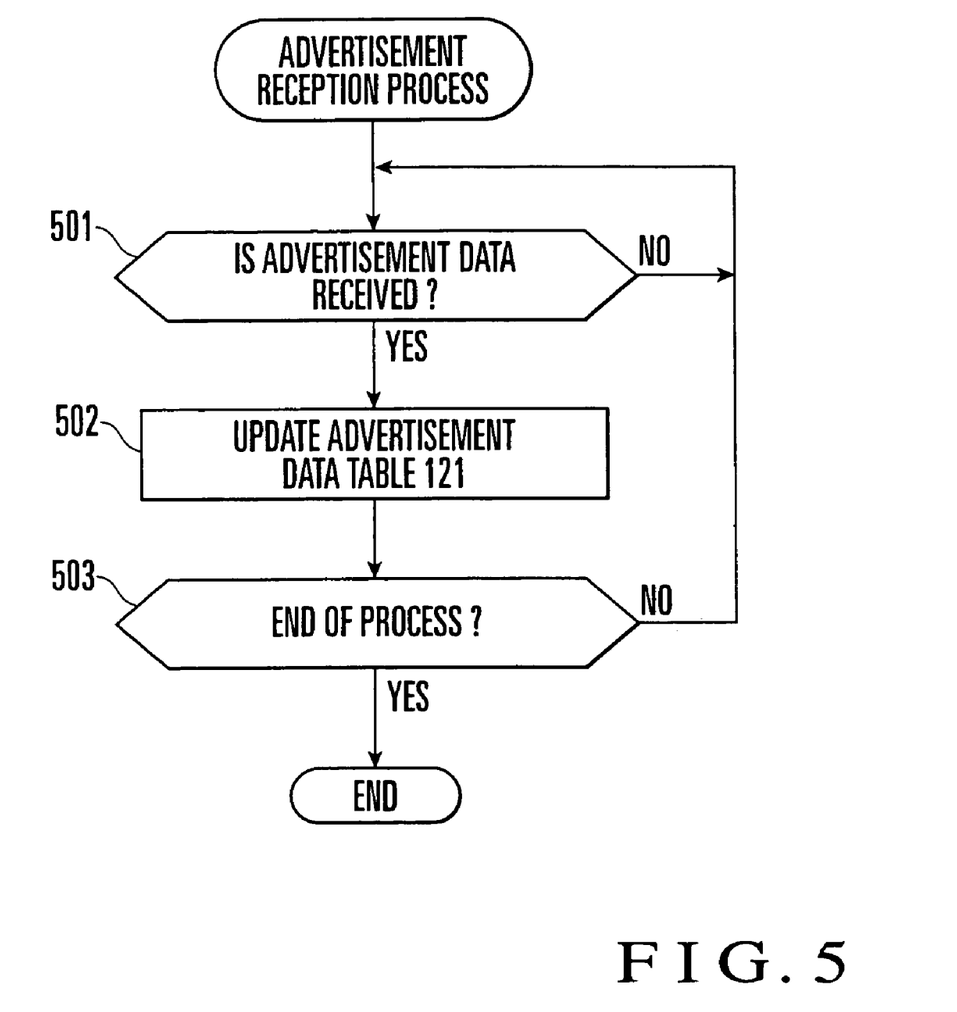
FIG. 5 is a flow chart showing the advertisement reception process performed by the distribution management server in FIGS. 1 and 4.

The advertisement reception process performed by the distribution management server 12 will be described next with reference to the flow chart of FIG. 5. The advertisement reception process is the process of receiving the advertisement data uploaded from the upload terminal 11 and registering it on the advertisement data table 121. The distribution management server 12 is set in a standby state to be always ready to receive uploaded advertisement data (step S501). In addition to the data of the advertisement text, advertisement data contains information, such as distribution request time, distribution intervals, save expiration date, desired distribution area, sponsor identification information, category, and data attribute. The data of the advertisement text is stored in the distribution server 13.

The distribution request time indicates the date when the sponsor wants to distribute the advertisement. The distribution intervals indicate standard time intervals at which the advertisement is distributed. The save expiration date indicates the duration during which distribution is continued. Any data that has expired is deleted. The category indicates the field to which the advertisement belongs to be distributed in accordance with user's preferences. Examples of the category are "shopping", "eating and drinking", "recreation", and "event". These categories are further classified hierarchically. For example, "shopping" is further classified into categories, e.g., "PC" and "fashion". The data attribute indicates the specific form of the advertisement data. Examples of the data attribute are electronic mail (MAIL), a Web page image (WEB), and voice information (VOICE).

Figure 8:
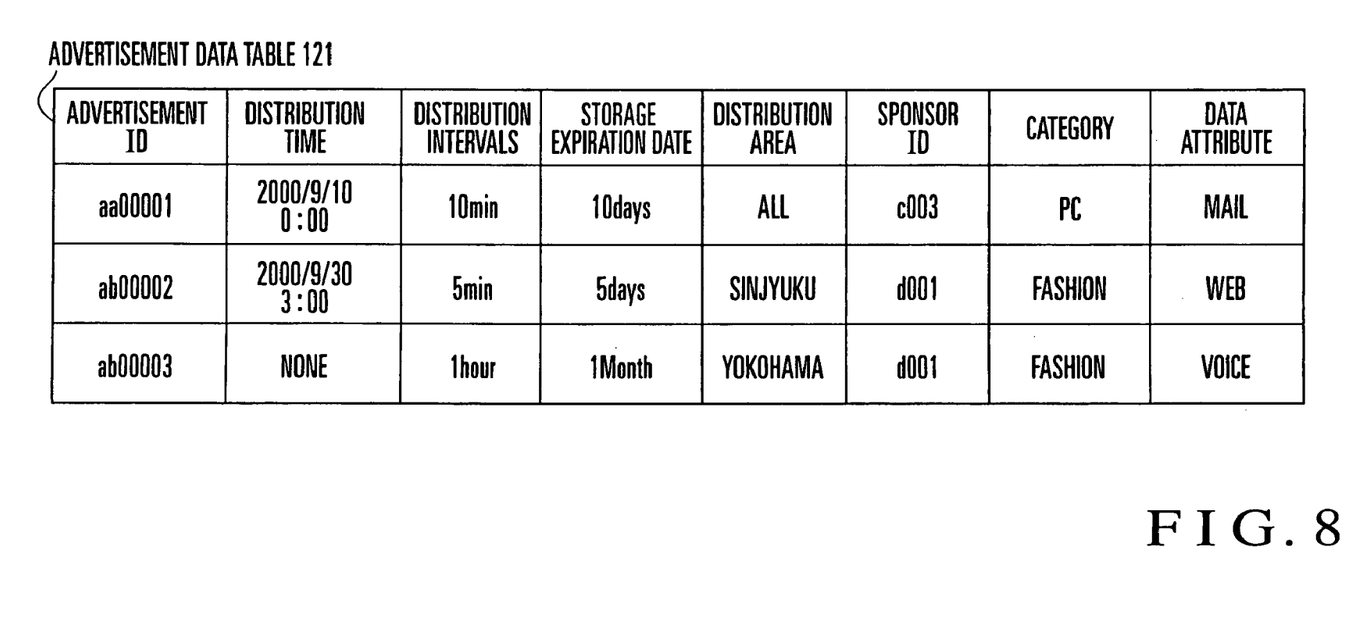
FIG. 8 is a view showing an example of the information registered in an advertisement data table 121.

Upon reception of the advertisement data uploaded from the upload terminal 11, the distribution management server 12 registers information such as the distribution request time, distribution intervals, storage expiration date, desired distribution area, sponsor identification information, category, and data attribute contained in the advertisement on the advertisement data table 121 (step S502). FIG. 8 shows an example of the information registered on the advertisement data table 121.

When registration on the advertisement data table 121 is completed, the distribution management server 12 checks whether all the received advertisement data are processed (step S503). If all the advertisement data are processed, the advertisement reception process is terminated. If any received advertisement data is left unprocessed, the flow returns to step S501 to continue the advertisement reception process.

The distribution condition update process performed by the distribution management server 12 will be described next with reference to the flow chart of FIG. 6. The distribution condition update process is the process of receiving a user operation notification from the portable terminal 14 and updating the user information table 122.

Figure 9:
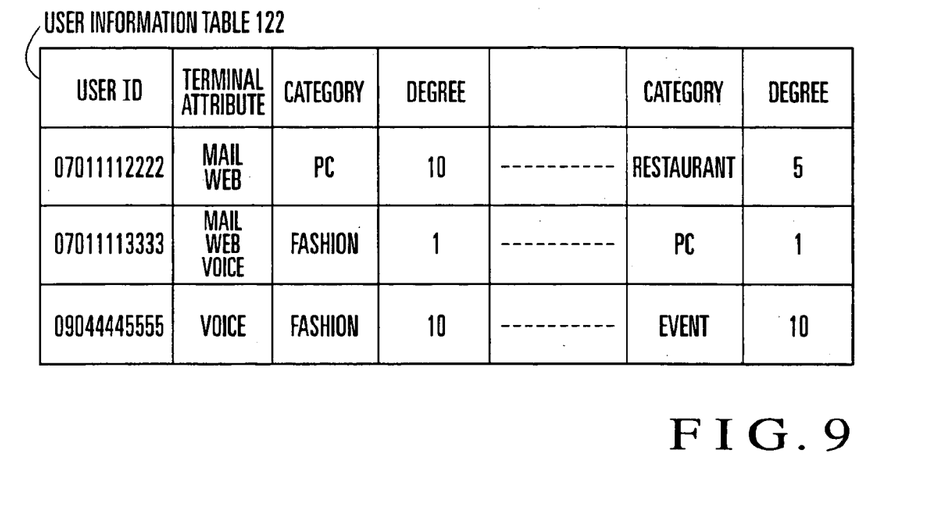
FIG. 9 is a view showing an example of the information registered in a user information table 122.

As shown in FIG. 9, the user information table 122 is comprised of a user ID, terminal attributes, category, and degree. The terminal attributes indicate the functions of the portable terminal. Referring to FIG. 9, the terminal attributes of the terminal of the user with the user ID "07011113333" are "MAIL/WEB/VOICE", and hence the terminal can receive electronic mail, a Web page image, and voice data.

The degree is a value representing how much the user is interested in the advertisement belonging to each category, and is calculated upon user operation "save" and "delete". When the user "saves" advertisement data, the degree is incremented by one. When the user "deletes" the advertisement data, the degree is decremented by one. Referring to FIG. 9, for example, with regard to the user with the user ID "07011113333", the degree of "fashion" is "1". If the user saves many advertisement data belonging to this category, the degree increases. A high degree indicates that the user's interest in the advertisement belonging to this category is high.

Figure 6:
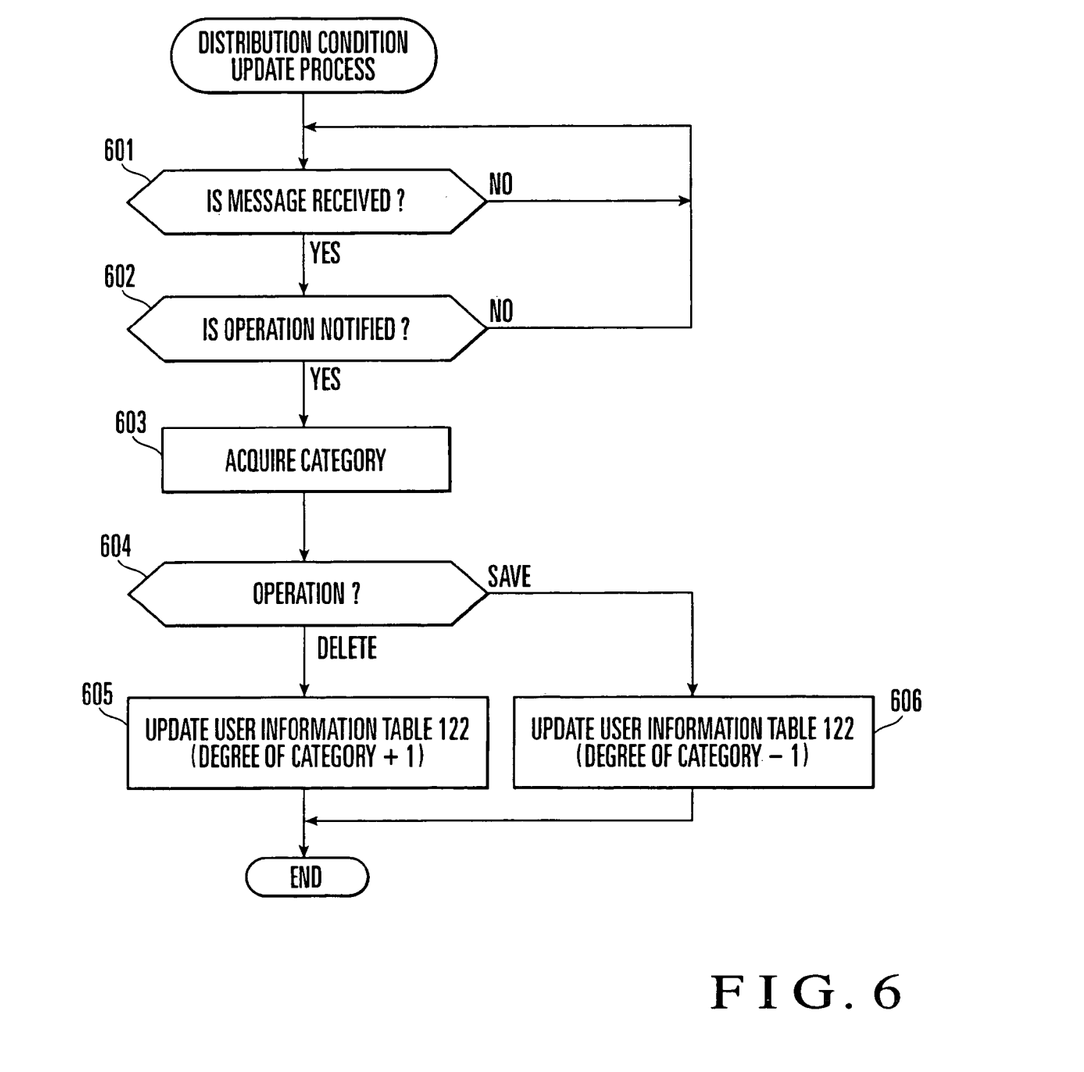
FIG. 6 is a flow chart showing the distribution condition update process performed by the distribution management server in FIGS. 1 and 4.

As shown in FIG. 6, the distribution management server 12 is in a standby state to be always ready to receive a message notifying user operation (step S601). Upon reception of a message notifying user operation, the distribution management server 12 checks whether the message is a message notifying user operation (step S602). If this message is not a message notifying user operation, the flow returns to step S601 to be set in a standby state to be ready to receive a message.

If the message is a message notifying user operation, the distribution management server 12 searches the advertisement data table 121 with the advertisement ID contained in the message to acquire the category of the advertisement (step S603). If, for example, the advertisement ID is "ab00002" in FIG. 8, the category of the advertisement is "fashion".

It is then checked whether the user operation contained in the message is "save" or "delete" (step S604). If the user operation is "save", the degree of the category corresponding to the advertisement ID contained in the message is incremented by one in the user information corresponding to the user ID contained in the message (step S605). If the user operation is "delete", the corresponding category is decremented by one (step S606).

Figure 7:
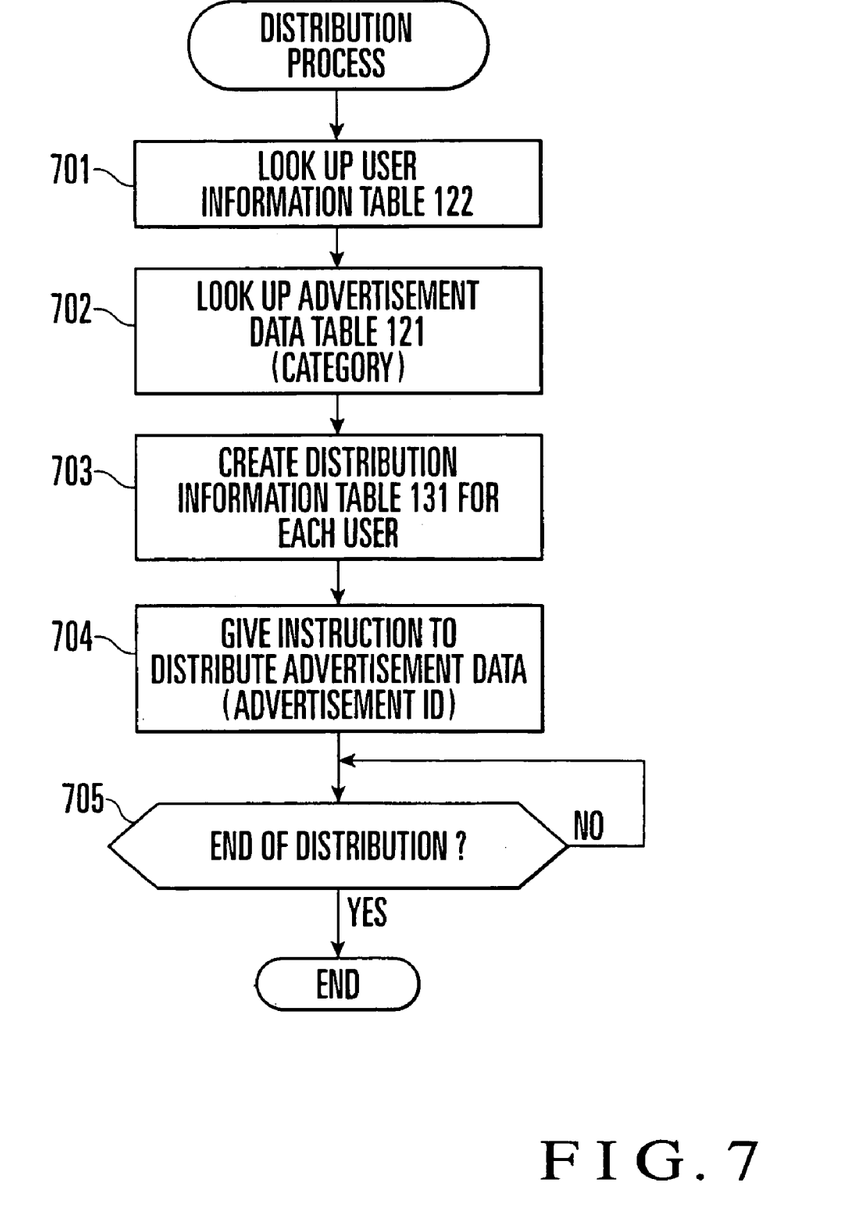
FIG. 7 is a flow chart showing the distribution process performed by the distribution management server in FIGS. 1 and 4.

The distribution process performed by the distribution management server 12 will be described next with reference to the flow chart of FIG. 7. The distribution process is the process of looking up the user information table 122 and advertisement data table 121 to determine advertisement data to be distributed to each user, and instructing the distribution server 13 to distribute the advertisement data. The distribution management server 12 arranges categories, each exhibiting a degree equal to or more than a predetermined threshold, in descending order of degree for each user by looking up the user information table 122 (step S701).

The distribution management server 12 then extracts advertisement data associated with each of the categories arranged in step S701 by looking up the advertisement data table 121 (step S702). The distribution management server 12 creates, in the distribution server 13, a distribution information table 131 in which the advertisement data extracted in step S702 are arranged in correspondence with the respective categories arranged in step S701 (step S703).

Figure 10:
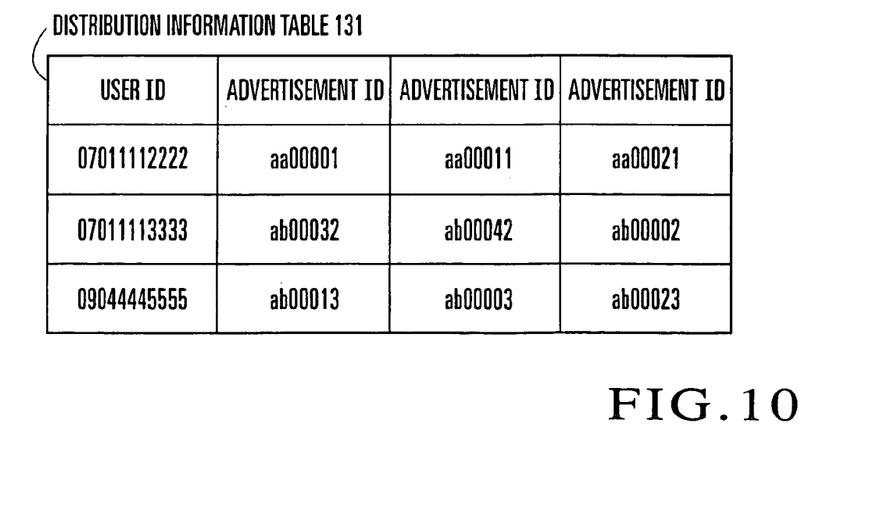
FIG. 10 is a view showing an example of the information registered in a distribution information table 131.

FIG. 10 shows an example of the information registered in the distribution information table 131. In the distribution information table 131, advertisement data associated with categories with high degrees are arranged in descending order of degree for each user. In the distribution information table 131, advertisement data to be distributed in one cycle. In the case shown in FIG. 10, three advertisement data are distributed in one cycle.

The distribution management server 12 then instructs the distribution server 13 to distribute advertisement data in accordance with the distribution information table 131 (step S704). The distribution management server 12 monitors the completion of the distribution of the advertisement and terminates the distribution process if it is completed (step S705).

The operation of the portable terminal 14 will be described next. The portable terminal 14 performs user registration in the distribution management server 12 to receive the advertisement data distributed from the distribution server 13. All advertisement data are distributed to the user immediately after user registration because no information about the favorite categories of the user is registered in the distribution management server 12. Upon reception of the distributed advertisement data, the user selects necessary advertisement data and unnecessary advertisement data to "save" the necessary data in the portable terminal 14 and "delete" the unnecessary data. For example, advertisement data is displayed as wallpaper on the screen of the portable terminal 14. This advertisement can be reduced and displayed by changing the settings of the portable terminal 14.

When the user performs operation such as "delete" or "save", the portable terminal 14 transmits a message notifying the user operation to the distribution management server 12. This message contains the advertisement ID for which the operation has been performed, the contents of the user operation ("delete" or "save"), the operation date, and the user ID. User operation for one advertisement may be transmitted as one message or a set of user operations for a plurality of advertisement data may be transmitted as one message.

In this embodiment, when the user operates the portable terminal to delete or save the advertisement data distributed from the advertisement distribution center, the portable terminal notifies the advertisement distribution center of the corresponding operation data. The advertisement distribution center sets a condition for the subsequent distribution of advertisement data to the user in accordance with the presence/absence of notification of operation data corresponding to the immediately preceding advertisement data.

The above embodiment has exemplified the system for distributing advertisement data to the portable terminal 14. However, the data to be distributed are not limited to advertisement data. The present invention can be applied to various data to be preferably distributed to users in accordance with user's preferences. In addition, the device at a distribution destination is not limited to a portable terminal. The present invention can be applied to any device that can be connected to a communication network, e.g., personal computers.

An advertisement distribution system according to another embodiment of the present invention will be described next.

In this embodiment, in distributing advertisement data to a portable terminal 14, a distribution management server 12 receives a response from the portable terminal 14 first, and then distributes the next advertisement data. Upon distributing advertisement data to the specific portable terminal 14, a distribution server 13 does not distribute the next advertisement data to the portable terminal 14 until it receives a message notifying user operation for the advertisement data from the portable terminal 14.

According to this embodiment, since no next advertisement data is transmitted unless the user performs operation "save" or "delete", no distributed advertisement data is overwritten by the next advertisement data before the distributed advertisement data is "saved" or "deleted".

As has been described above, according to the present invention, the terminal of each user notifies the distribution center of user operation for distributed data, and data to be distributed to each user are selected on the basis of the preferences of each user which are acquired from the contents of each notification in the distribution center. Therefore, selected data that accurately reflect the user's preferences can be quickly distributed to the respective users.

What is claimed is:

1. A data distribution method of distributing data selected for each of a plurality of user terminals from a distribution center to each user terminal through a communication network, comprising the steps of:
   a) distributing various data to a user terminal among said plurality of user terminals, said various data being advertising data;
   b) selecting at said user terminal, using a first user operation, at least one data among said various data which a user desires to receive, said selected data being desired data;
   c) selecting at said user terminal, using a second user operation, at least another data among said various data which the user does not desire to receive, said selected data being undesired data;
   d) sending a notification to the distribution center of a content of the first and second user operations for the various data distributed to the user terminal;
   e) causing the distribution center to receive the notification from the user terminal;
   f) selecting data to be subsequently distributed to the user terminal by using the contents of the first and second user operations contained in the notification from the user terminal;
   g) distributing the selected data to the user terminal; and
   h) performing steps a) through g) for each of said plurality of user terminals.

2. A method according to claim 1, wherein
   identification codes for identifying said various data are attached to the various data distributed from the distribution center, and
   the notification includes contents of the first and second user operation in correspondence with the identification codes.

3. A method according to claim 1, wherein when the data distributed to the terminal is deleted by the user, the terminal notifies the distribution center of a deleting operation as contents of said second user operation.

4. A method according to claim 1, wherein when the data distributed to the terminal is saved by the user, the terminal notifies the distribution center of a saving operation as contents of said first user operation.

5. A method according to claim 1, wherein after distributing some of said various data to the user terminal, the distribution center stops distributing other of said various data to the user terminal until said notification is received from the user terminal.

6. A data distribution system for distributing data selected for each of a plurality of user terminals from a distribution center to each user terminal through a communication network, comprising:
   a) means for distributing various data to each user terminal among said plurality of user terminals, said various data being advertising data;
   b) means for selecting at said each user terminal, using a first user operation, at least one data among said various data which the-each user desires to receive, said selected data being desired data;
   c) means for selecting at said each user terminal, using a second user operation, at least another data among said various data which the each user does not desire to receive, said selected data being undesired data;
   d) sending a notification to the distribution center of a content of the first and second user operations for the various data distributed to the each user terminal;
   e) means for causing the distribution center to receive the notification from the each user terminal;
   f) means for selecting data to be subsequently distributed to the each user terminal by using the contents of the first and second user operations contained in the notification from the each user terminal;
   g) means for distributing the selected data to the each user terminal.

7. A system according to claim 6, wherein
said data distribution center comprises:
a first table storing data to be distributed to the plurality of user terminals; and
a second table for updating/storing contents of each user operation notified from the plurality of user terminals for each user terminal, and
said means for selecting data to be subsequently distributed to the each user terminal includes data distribution means for updating/storing contents of said second table in accordance with the contents of the first and second user operations contained in notification, and selects additional data to be distributed to the plurality of user terminals in accordance with the updated contents of the second table.

8. A system according to claim 7, further comprising an upload terminal for transmitting, to said first table, data to be distributed to the plurality of user terminals.

9. A data distribution apparatus for distributing data selected for each of a plurality of users to a plurality of user terminals corresponding to each of said plurality of users through a communication network, comprising:
   communication control means for receiving a message containing contents of a first and a second user operation for various data distributed to each of the plurality of user terminals, said first user operation selecting at least one data which the user desires to receive, said selected data being desired data, and said second user operation selecting at least other data which the user does not desires to receive, said selected data being undesired data, said various data being advertising data;
   data processing means for analyzing the message received by said communication control means and identifying the message containing the contents of the first and second user operation for each of said plurality of users; and
   analyzing means for selecting data to be subsequently distributed to the plurality of user terminals by analyzing the contents of the first and second user operations contained in the message identified by said data processing means for each of said plurality of users.

10. A system according to claim 9, wherein
said system further comprises:
a first table storing various data to be distributed to the plurality of user terminals, said various data being advertising data; and
a second table for updating/storing contents of the first and second user operations notified from the plurality of user terminals, and
said second table is updated/stored in accordance with the contents of first and second user operations contained in a received message upon reception of the message from the plurality of user terminals, and data to be distributed to the plurality of user terminals is selected in accordance with the updated contents of second table.

11. A recording medium recording a data distribution program for distributing various data selected for each of a plurality of user terminals from a distribution center to each of said plurality of user terminals through a communication network,
   the data distribution program executable on a computer for performing the following steps of:
   notifying the distribution center of contents of a first and second user operation for the various data distributed to the user terminal, said first user operation selecting at least one data which the user desires to receive, said selected data being desired data; and said second user operation selecting at least another data which the user does not desires to receive, said selected data being undesired data, said various data being advertising data;
   causing the distribution center to receive a notification from each of the plurality of user terminals;
   selecting data to be subsequently distributed to each of the plurality of user terminals using the contents of the first and second user operations contained in the notification from each of the plurality of user terminals; and
   distributing the selected data to the plurality of user terminals.

* * * * *